Feb. 24, 1953

K. KAEHLERT 2,629,270

BORING BAR MICROMETER TOOL

Filed May 8, 1951

KURT KAEHLERT
INVENTOR.

BY
ATTORNEYS

Patented Feb. 24, 1953

2,629,270

UNITED STATES PATENT OFFICE 2,629,270

BORING BAR MICROMETER TOOL

Kurt Kaehlert, Springfield, N. J.

Application May 8, 1951, Serial No. 225,183

3 Claims. (Cl. 77—58)

This invention deals with boring bars, and more particularly with a boring bar having a tool bit directly connected to a micrometer screw.

Boring bars, of course, are old in the art. In recent years boring heads have been available with micrometer offset screws located in the head, such adjustments being intended to eliminate the need for offset boring bars. However, as far as is known, there has not been available a boring bar having a micrometer adjustment for the bit along the axis of the bar, in spite of the need for such a tool.

In long boring operations with a conventional boring bar, the micrometer for measuring the linear projection of the tool from the head along the axis of the bar is located on the head. Due to the tension on the bar and the angular displacement caused by the pressure of the tool on the work, the readings obtained are not accurate, and it is necessary to pull the bar out of the work and thus obtain an accurate micrometer reading.

The device of the present invention comprises a micrometer screw directly connected in a linear manner to the cutting tool or bit. Hence, since the micrometer is on the tool itself, direct accurate micrometer readings are possible.

Figure 1:
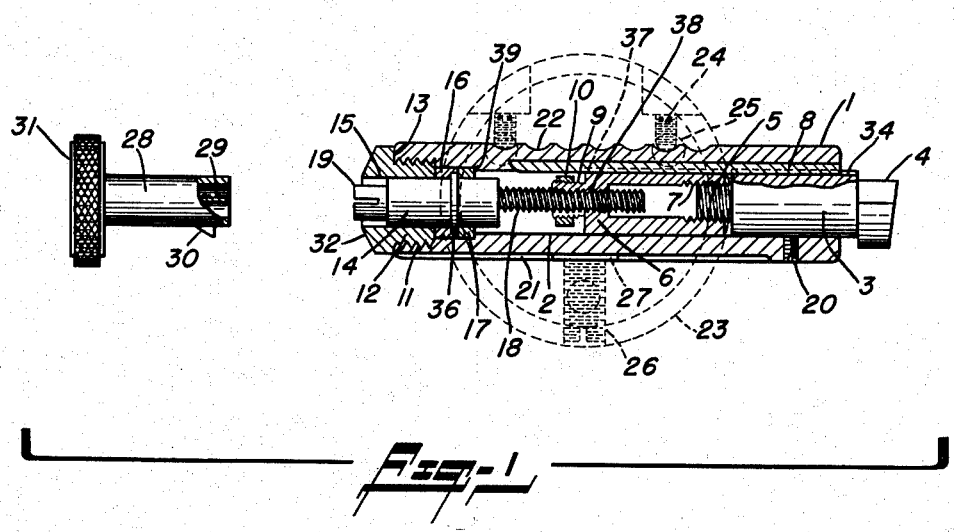
Figure 2:
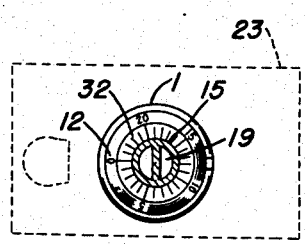
Figure 3:
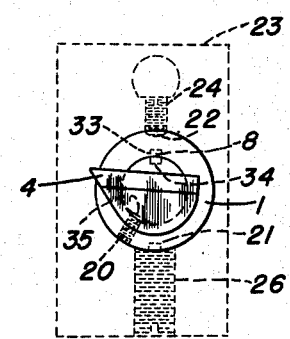

The invention may be more readily understood by reference to the accompanying drawing in which Figure 1 is a side view, mostly in cross-section of the cutting tool and the indicator turning knob used to effect the micro movement of the bit. A rear end view of the tool, showing the micrometer scale, is depicted in Figure 2, while Figure 3 illustrates the front or bit end of the tool. Similar numbers refer to similar parts in the various figures.

Referring again to the drawing, numeral 1 represents a metal barrel having internal bore 2 in which rides bit holder 3. Bore 2 may be circular, square, or any other shape, although a circular bore is preferred. When a circular bore 2 is employed, its periphery is provided with longitudinal groove 33 in which is inserted projecting key 8. The outside surface of bit holder 3 is also provided with a corresponding keyway or groove 34 in which rides key 8, thus preventing axial rotation of holder 3.

The rear portion 5 of bit holder 3 is turned down and threaded to engage inside threads 7 of follower 6 which likewise rides in bore 2 and is provided with longitudinal keyway 37 to prevent rotation of said follower in the bore. The rearward end of follower 6 has a smaller inside thread 38 for engaging the thread on micrometer screw 18. End 9 may be of the clutch or split screw engaging type on which rides threaded washer 10 which keeps together the clutch portions.

Micrometer screw 18 terminates at its rearward end with anchored head 14 from which projects anchoring fin 36 disposed between two floating washers 16 and 17, one of the washers being recessed to allow a loose fit for rotation of fin 36 therebetween.

Forward washer 17 rests on shoulder 39 cut into bore 2 which serves to limit forward motion of screwhead 14 into bore 2. A wider threaded opening 11 is provided in bore 2 to receive cap 12 having central opening 15 in which rides screwhead 14. Engaging end 19 of screwhead 14 is of such size as to allow slipping thereover of tube 28 attached to turning knob 31. Crosspiece 29 in tube 28 engages the slot in end 19 and thus allows turning of screwhead 14 and, in turn, micrometer screw 18. Indicator 30 is provided on tube 28 to indicate the position of screwhead 14 with respect to scale 32 on cap 12.

The outer surface of barrel 1 may be provided with center holes or stops 22 which may be accurately spaced (say every ¼″) along the barrel. These stops are used to lock barrel 1 in place in head 23 by means of lockscrew 24, and also allow successive forward projection of the barrel and tool for an accurate linear distance. It is apparent from the drawings that barrel 1 is reversible in holder 23, i. e. in Figure 1, bit 4 may be disposed either to the right of holder 23 or to the left, as the occasion demands. Bit holder 3 may also be locked in place by set screw 20 which rests on flat portion 35. The outside of barrel 1 may also be provided with longitudinal groove 21 in which rides set screw 26 in head 23 and carrying key 27. Threaded holes 25 in head 23 (which is of conventional design) are used for engagement with the boring bar.

In using the present device, it is customary first to do the rough boring with a standard tool bit which can be inserted in head 23. Thereafter, for the final boring operation, the standard tool bit is replaced with the device of the present invention, locking screw 24 in the desired stop 22. Then screw 20 is loosened to free bit holder 3, and bit 4 is adjusted to the desired amount of cut by turning micrometer screwhead 19 by means of turning knob 31. When the adjustment is completed, screw 20 is used to lock bit holder 3 in place, and the boring operation is continued, each succeeding cut being adjusted similarly after setting the bit depth by means of scale 32. When screwhead 19 is turned, fin 36 prevents any forward movement, so that micrometer screw 18 causes follower 6 to advance or recede, as desired, which, in turn, carries with it bit holder 3 and bit 4. Follower 6 allows independent turning of bit holder 3 so that grooves or slots 37 and 34 will be in line with each other.

It will be observed that the device of the present invention is a relatively simple, time-saving and inexpensive tool of extremely high accuracy. It may be used either as a fly boring tool or tail stock bar and can also be employed for external cutting operations, such as in turning shoulder flanges. Also, it facilitates getting into difficult boring positions not accessible to conventional boring tools. Besides these advantages, it also has a larger tool boring range. It is particularly advantageous in tail stock operations involving boring of back faces.

In back boring operations, for example, where the boring bar must be moved through the casting or machine part, and the job is to be bored either with a fly tool or with the help of the tail stock, the conventional boring head cannot be used in most cases. On the other hand, the device of the present invention, after taking the place of the roughing tool bit, can give the operator, from there on, a micrometer control of the boring tool to obtain the desired size. Furthermore, since the present micrometer tool bit is incorporated into a single unit, it is movable from one holder or adapter to another, giving an almost unlimited range of boring in finishing operations. Thus, the present tool should prove time-saving not only in horizontal or vertical boring, but also in milling machines and the like.

I claim:

1. A completely cylindrical boring bar micrometer tool, reversible in its holder and employing a micrometer screw with a head projecting from the end of the tool, said head having an engaging end for engaging an indicator sleeve which indicates its position on a stationary scale disposed around the periphery of said head, comprising, in combination, a cylindrical barrel, an axial bore in said barrel, a bit holder carrying a bit on its forward end and disposed in non-rotating relation in said bore, a follower riding in said bore in non-rotating relation thereto behind said bit holder and independently attached thereto, screw engaging means on the rearward portion of said follower for engaging a micrometer screw, and a micrometer screw held in said screw engaging means and extending into said bore from said head.

2. A boring bar micrometer tool according to claim 1 having a stationary cap in the end of said barrel and in which the engaging head of the screwhead rotates, a scale on said cap adjacent said engaging head, a sleeve engaging said engaging head for turning same, and an indicator projecting from said sleeve to indicate the position of the micrometer screw with respect to the scale.

3. A boring bar micrometer tool according to claim 1 in which the outside of the barrel has a longitudinal series of accurately spaced center holes in which said tool may be held during the boring operation.

KURT KAEHLERT.

REFERENCES CITED

The following references are of record in the file of this patent:

UNITED STATES PATENTS

| Number | Name | Date |
|---|---|---|
| 1,144,795 | Schmelzkopf | June 29, 1915 |
| 1,233,556 | Csigos | July 17, 1917 |
| 1,452,082 | Larsson | Apr. 17, 1923 |
| 2,107,222 | Summers | Feb. 1, 1938 |
| 2,282,919 | Zempel | May 12, 1942 |